United States Patent
An et al.

(10) Patent No.: US 11,946,524 B2
(45) Date of Patent: Apr. 2, 2024

(54) DOUBLE-RING SHAPED STRONG MAGNET ARRAY NONLINEAR DYNAMIC VIBRATION ABSORBER FOR VIBRATION MITIGATION OF SUSPENDER CABLES AND DESIGN METHOD THEREOF

(71) Applicant: DALIAN UNIVERSITY OF TECHNOLOGY, Liaoning (CN)

(72) Inventors: Yonghui An, Liaoning (CN); Shijun Huang, Liaoning (CN); Jinping Ou, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 446 days.

(21) Appl. No.: 17/292,623

(22) PCT Filed: Jun. 15, 2020

(86) PCT No.: PCT/CN2020/096135
§ 371 (c)(1),
(2) Date: May 10, 2021

(87) PCT Pub. No.: WO2021/253169
PCT Pub. Date: Dec. 23, 2021

(65) Prior Publication Data
US 2022/0128110 A1 Apr. 28, 2022

(51) Int. Cl.
*F16F 7/10* (2006.01)
*G06F 30/10* (2020.01)
(Continued)

(52) U.S. Cl.
CPC ............... *F16F 7/10* (2013.01); *G06F 30/10* (2020.01); *E01D 19/00* (2013.01);
(Continued)

(58) Field of Classification Search
CPC ......... F16F 7/10; F16F 2226/04; G06F 30/10; E01D 19/00
See application file for complete search history.

(56) References Cited

U.S. PATENT DOCUMENTS

2012/0247036 A1* 10/2012 Bournand ............... F16F 7/082
52/167.1
2017/0219045 A1* 8/2017 Glanzner ............... F16F 15/035

FOREIGN PATENT DOCUMENTS

| CN | 103758029 A | 4/2014 |
| CN | 103775549 A | 5/2014 |

(Continued)

*Primary Examiner* — Vishal R Sahni
(74) *Attorney, Agent, or Firm* — Muncy, Geissler, Olds & Lowe, P.C.

(57) ABSTRACT

A double-ring shaped strong magnet array nonlinear dynamic vibration absorber for vibration mitigation of suspender cables and design method thereof, which belongs to the field of structural vibration control. The installation positions and number are designed according to the demand of vibration mitigation, and usually one is installed at the midpoint of the suspender cable. The vibration absorber consists of the inner and outer magnet ring arrays, the additional weights, the universal wheels and a base. It feeds back the control force in the opposite direction of the motion of the suspender cable during the movement, so that the vibration energy of the suspender cable is transferred to the vibration absorber and thus less is returned to the suspender cable, and the energy dissipated through the friction between the universal wheels and the base, adding air dampers and other measures, etc.

2 Claims, 3 Drawing Sheets

(51) Int. Cl.
  *E01D 19/00* (2006.01)
  *G06F 111/10* (2020.01)
(52) U.S. Cl.
  CPC ....... *F16F 2222/06* (2013.01); *F16F 2222/08* (2013.01); *F16F 2226/04* (2013.01); *G06F 2111/10* (2020.01)

(56) References Cited

FOREIGN PATENT DOCUMENTS

| CN | 110409287 | A |   | 11/2019 |
|----|-----------|---|---|---------|
| CN | 110528381 | A |   | 12/2019 |
| CN | 110578297 | A |   | 12/2019 |
| CN | 114775407 | A | * | 7/2022  |
| JP | 2017025620| A |   | 2/2017  |
| KR | 101873361 | B1| * | 7/2018  |

* cited by examiner

DOUBLE-RING SHAPED STRONG MAGNET ARRAY NONLINEAR DYNAMIC VIBRATION ABSORBER FOR VIBRATION MITIGATION OF SUSPENDER CABLES AND DESIGN METHOD THEREOF

TECHNICAL FIELD

The present invention relates to the field of vibration control for engineering structures, specifically the field of passive control of structures based on the nonlinear dynamic vibration absorber, with concrete application to vibration control of the suspender cables of suspension bridges and arch bridges and other cable structures.

BACKGROUND

Large-span cable-supported bridges are often important transportation hubs, and they are often built in rivers, lakes and seas, deep mountain valleys and other areas with complex terrain, intense atmospheric activity and frequent strong winds, as a key load bearing member of suspension bridges and arch bridges, the suspender cable becomes thinner, longer and more flexible with the increase in the bridge span, coupled with its small damping and other characteristics, leading to be affected by issues of the prominent wind-induced dynamic effects and long-term reciprocal vibration-induced fatigue damage accumulation etc., which has become one of the key challenges to its long-term safe service and service life. In recent years, videos of some large-span suspension bridge monitoring systems show that violent vibration phenomenon of the suspender cable in extreme weather repeatedly occurred, which is getting more and more attention from researchers and engineers. Therefore, effective vibration mitigation measures are required to be taken to control the vibration of the cable, to ensure its service and traffic safety, and to extend its service life.

Currently, the common method is to install separators or tuned mass dampers (TMD): (1) Separators cannot be installed on the single-rod suspender cable, while the requirements for optimal control of TMD are often harsh and the selection range of optimal parameters in the design is narrow, and TMD are prone to spring fatigue, corrosion and aging problems in long-term service, which leads to changes in their frequencies and greatly reduces the vibration mitigation effect of the TMD; meanwhile, the TMD has the undesirable phenomenon that the vibration response of the controlled structure increases under the load of a specific frequency band range, and it is necessary to narrow the width of this band and reduce the amplitude of the vibration response under its range. (2) The installation of separators between the cables of the double-rod and four-rod suspender cables can effectively avoid the phenomenon of hitting the cable; but the separator has little effect on vibration mitigation in the direction perpendicular to the plane of the double cables; there is a certain vibration mitigation effect in both directions for the four-rod cable, but the aerodynamic interference of galloping still makes the vibration problem prominent. Therefore, the suspender cable still lacks a vibration control solution with good damping effect, easily tuned parameters, robust control, easy maintenance and relatively wide applicability.

The invention proposes a double-ring shaped strong magnet array nonlinear dynamic vibration absorber for vibration mitigation of suspender cables, which is a structural passive control device; it controls the linear and nonlinear stiffness values by changing the geometric and physical parameters of the strong magnet array in the inner and outer rings, and it uses the friction between the universal wheels and the base of the vibration absorber or the added air dampers and other measures to dissipate energy, so as to suppress the vibration of the cable to be controlled. Due to the introduction of the nonlinear stiffness, its optimal parameter domain has been greatly expanded, and the robustness of vibration mitigation effect has been effectively improved, and its undesirable phenomenon of increasing the vibration response of the controlled structure under the load of a specific frequency band range has been greatly improved compared with TMD. All of these features make its application to the suspender cable is expected to achieve good vibration mitigation effect, and has the advantages of easy tuning of parameter, strong durability, easy maintainability, and applicability for all single/double/four-rod suspender cables, etc.

The present invention provides a convenient and practical solution for vibration control of suspender cables for the large-span bridge, and provides support for ensuring safe service and service life of the suspender cables. The specification only takes the application of suspender cables for the large-span bridge as an example, and the invention is also applicable to the vibration control of other cable structures.

SUMMARY OF THE INVENTION

The present invention provides a double-ring shaped strong magnet array nonlinear dynamic vibration absorber for vibration mitigation of suspender cables, and the vibration absorber can reduce the horizontal dynamic response of the suspender cable under various excitations, and suppresses its vibration.

The technical solution of the invention:

A double-ring shaped strong magnet array nonlinear dynamic vibration absorber for vibration mitigation of suspender cables, which includes an inner magnet ring array (2), an outer magnet ring array (3), additional weights (4), universal wheels (5) and a base (6); wherein, when used for in-service suspender cables (1), the inner magnet ring array (2) is made of two inner ring subdivisions (7), and each inner ring subdivision (7) having a designed number of slots, then an inner ring magnet shoe (8) is put in each slot, and inner ring steel limiters (9) are fixed to the corresponding inner ring subdivision (7) by bolts, then non-slip gaskets are added to inside of the inner ring subdivision (7), and then the inner magnet ring array (2) is fixed at installation position of the suspender cable (1); the outer magnet ring array (3) is similar in construction to the inner magnet ring array (2), and each outer ring magnet shoe (16) is placed in a designed slot and fixed to an outer ring subdivision I (17) and an outer ring subdivision II (18) by outer ring steel limiters (15), and the outer magnet ring array (3) is connected to the additional weights (4) and the universal wheels (5) respectively by bolts, and the additional weights (4) are installed on periphery of the outer magnet ring array (3) and fixed together with the outer magnet ring array (3); the additional weight (4) is a square-shaped body which is put four cuboid mass blocks together by bolts; the base (6) is made of two identical base subdivisions (21), with non-slip gaskets on inside of the base (6), and the two identical base subdivisions (21) are fixed to the installation position of the suspender cable (1) by bolts to support the outer magnet ring array (3), the additional weights (4) and the universal wheels (5); the universal wheels (5) are in direct touch with the base (6), rotate in any direction, and provide damping by friction with the base (6), and the damping provided is adjusted by changing coefficient of friction between the universal wheels (5) and the base (6); dissipation of energy is through damping provided by friction, or by adding several air dampers between the inner magnet ring array (2) and the outer magnet ring array (3); dimensions of the additional weights (4), the inner ring magnet shoe (8) and the outer ring magnet shoe (16) are designed according to basic parameters of the suspender cable (1) to be controlled, and magnetic force between the inner magnet ring array (2) and the outer magnet ring array (3) ensures that the outer magnet ring array (3) does not collide with the inner magnet ring array (2) during movement; installation positions and number of the double-ring shaped strong magnet array nonlinear dynamic vibration absorber on the suspender cable (1) are designed according to dynamic characteristics and demand of vibration mitigation of the suspender cable (1) to be controlled, with at least one installed at midpoint position of the suspender cable (1).

A design method of a double-ring shaped strong magnet array nonlinear dynamic vibration absorber for vibration mitigation of suspender cables comprises steps of:

Step 1, obtaining basic characteristics of suspender cable (1) to be controlled by field survey or looking over design parameters: outer diameter of sheath for the suspender cable, and natural frequencies;

Step 2, determining basic design parameters of the double-ring shaped strong magnet array nonlinear dynamic vibration absorber to be designed:

1) Ratio of sum of masses of an outer magnet ring array (3) and additional weights (4) to modal mass of the suspender cable (1): 1% to 5%, and within which the larger the mass ratio, the better the vibration mitigation effect, and the ratio should be determined according to demand of vibration mitigation for the suspender cable (1);

2) Damping ratio of the vibration absorber: design damping ratio of the vibration absorber is taken as design damping ratio of optimal tuned mass damper under the same mass ratio;

3) Linear and cubic stiffness values of the vibration absorber: numerical model of cable-absorber system is established as shown in equation (1):

$$\begin{cases} M\ddot{w}(t) + C\dot{w}(t) + Kw(t) = F(t) \\ m\ddot{v} + c[\dot{v} - \dot{w}\delta(x-d)] + k_1[v - w\delta(x-d)] + k_2[v - w\delta(x-d)]^3 = 0 \end{cases} \quad (1)$$

where, w(t) denotes vector of displacements corresponding to each degree of freedom of the suspender cable, $\dot{w}$(t) and $\ddot{w}$(t) correspond to velocity and acceleration of the suspender cable, respectively; M is mass matrix of the suspender cable; C is damping matrix of the suspender cable using Rayleigh damping; K is stiffness matrix of the suspender cable; F(t) is sum of external loads on the suspender cable and reaction of the vibration absorber to the suspender cable; m, c, $k_1$, $k_2$ denote mass, damping, linear stiffness and nonlinear stiffness of the vibration absorber, respectively; v denotes displacement of the vibration absorber, $\dot{v}$ and $\ddot{v}$ denote velocity and acceleration of the vibration absorber, respectively; one end of the suspender cable is starting point of x-axis, x is x-axis coordinate of point on the suspender cable, d is installation location of the vibration absorber on x-axis, and $\delta$(x–d) is Dirac function;

Equation (2) is objective function for parameter optimization, $$J = \min\left(\frac{\Delta_{con}}{\Delta}\right) \quad (2)$$

where $\Delta$ denotes a root-mean-square value, variance of time-history responses of displacement or velocity at a specific location along the suspender cable under an influence of white noise load; $\Delta_{con}$ denotes corresponding values when the vibration absorber is deployed under identical conditions for vibration mitigation;

Based on optimal linear stiffness of TMD, optimal parameters ranges of the linear stiffness and nonlinear stiffness of nonlinear absorber are determined, dynamic responses of the suspender cable are calculated by using the numerical model of the cable-absorber system under the white noise loads at multiple points, and the optimal linear stiffness and the optimal nonlinear stiffness are obtained by automatic optimization;

4) Geometric parameters of the inner and outer magnet ring arrays: with overall consideration of cost of the vibration absorber and section size of the suspender cable to be controlled, number, radius angle and inner diameter of magnet shoes in the inner magnet ring array (2) and the outer magnet ring array (3) can be determined; a parametric electromagnetic field numerical model of the double-ring shaped strong magnet array nonlinear dynamic vibration absorber system is established, and by adjusting thickness and height of the magnet shoe, combination of inner and outer magnet ring arrays composed of the inner magnet ring array (2) and the outer magnet ring array (3) achieves designed linear stiffness and designed cubic stiffness;

5) Geometric parameters of additional weights (4) for the vibration absorber: total mass of the vibration absorber minus mass of the outer magnet ring array (3) is the mass of additional weights (4), and then length, width and height of the additional weights (4) are designed according to density of additional weight block;

Step 3, machining and fabricating the double-ring shaped strong magnet array nonlinear dynamic vibration absorber according to the design parameters obtained from step 2;

Step 4, installing the manufactured double-ring shaped strong magnet array nonlinear dynamic vibration absorber on the suspender cable in the laboratory, and measuring the force-displacement relationship of the double-ring shaped strong magnet array nonlinear dynamic vibration absorber with a dynamometer and a ruler to ensure the linear stiffness and the cubic stiffness to be the design values; letting the vibration absorber move freely, then measuring the displacement signal, and determining the damping ratio by free vibration attenuation method etc., and then adjusting the damping ratio by adjusting the friction force between universal wheels (5) and a base (6) or by setting other damping to make that the damping ratio reaches or approaches the optimal damping ratio.

The beneficial effect of the invention is that the double-ring shaped strong magnet array nonlinear dynamic vibration absorber installed on the bridge suspender cable can effectively reduce the vibration displacement response and vibration velocity response of the suspender cable, can ensure the safety of the suspender cable service and the traffic, and can reduce the fatigue damage of the suspender cable and thus effectively extend its service life; due to the introduction of both nonlinear stiffness and linear stiffness, the invention has the advantages of easy tuning of parameters, high robustness of vibration mitigation effect, easy installation, without or only little maintenance and easy maintainability, and applicability for single, double and four-rod suspender cables, etc., and it is expected to achieve the goal of good vibration mitigation effect in the whole life cycle of the suspender cable.

Figure 1:
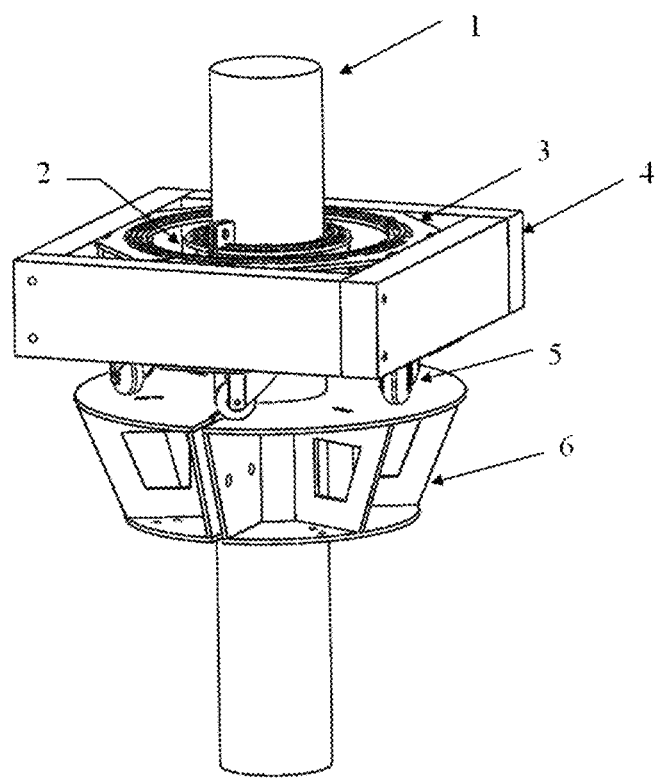
FIG. 1 is a schematic diagram of the invented double-ring shaped strong magnet array nonlinear dynamic vibration absorber for the suspender cable.
Figure 2:
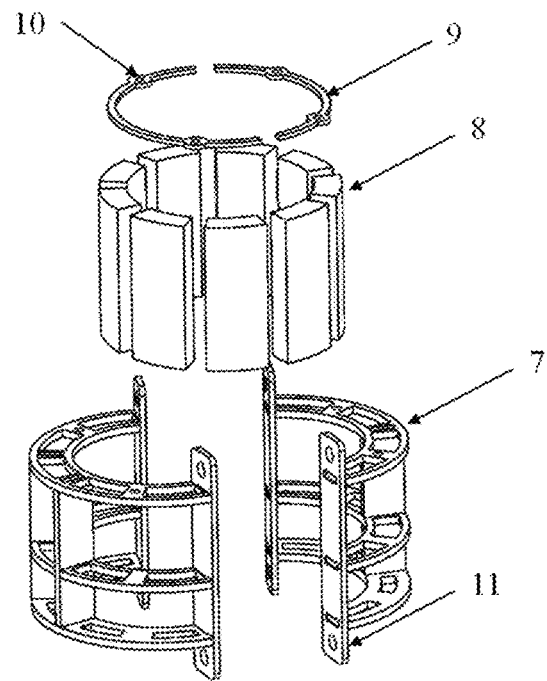
FIG. 2 is a schematic diagram of an inner magnet ring array.
Figure 3:
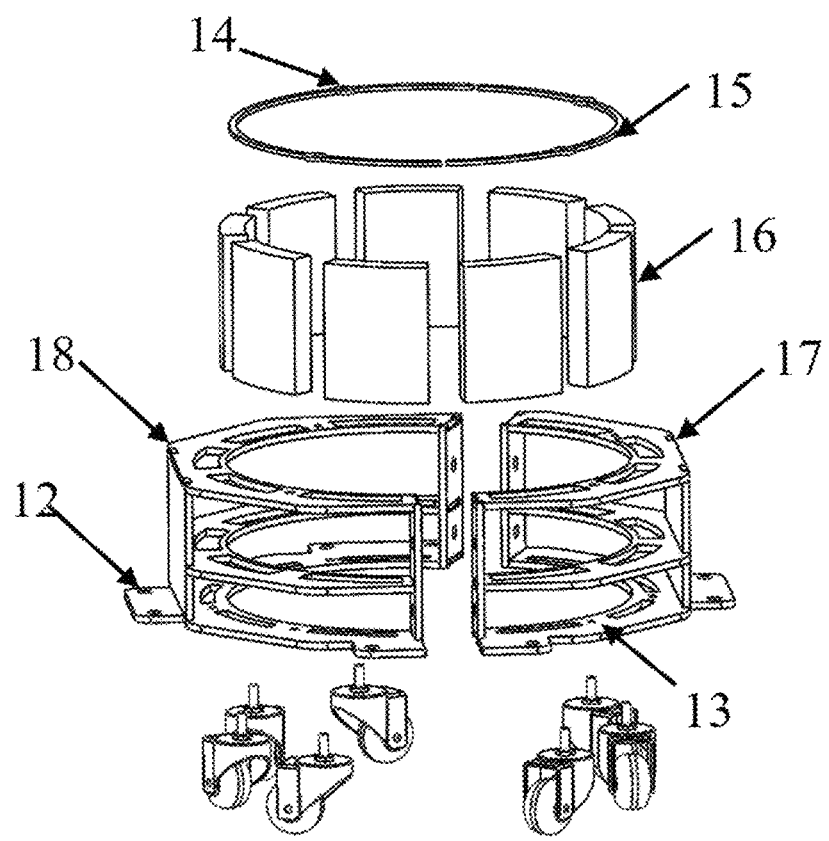
FIG. 3 is a schematic diagram of an outer magnet ring array.
Figure 4:
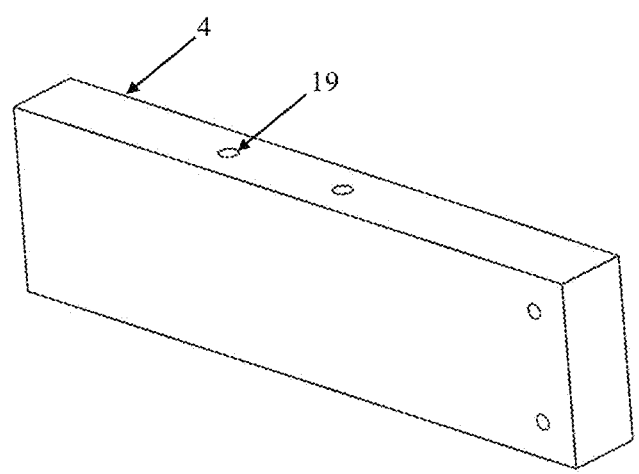
FIG. 4 is a schematic diagram of an additional weight subdivision.
Figure 5:
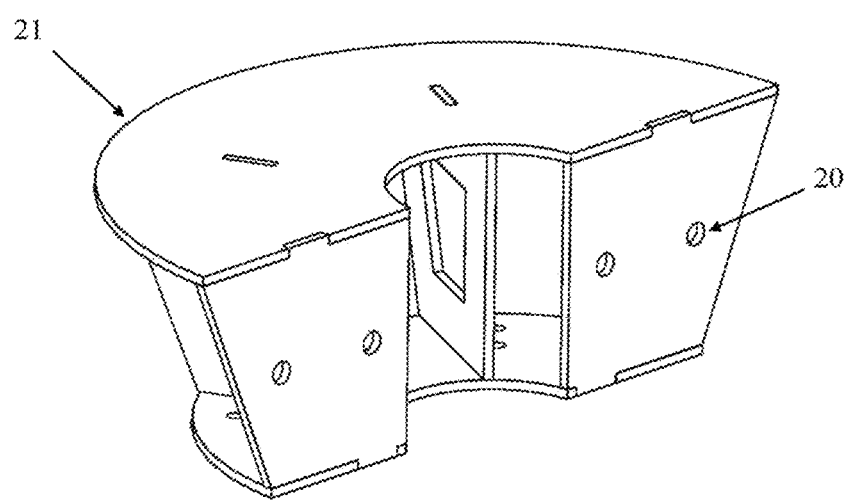
FIG. 5 is a schematic diagram of a base subdivision.

Where: 1 suspender cable; 2 inner magnet ring array; 3 outer magnet ring array; 4 additional weight; 5 universal wheel; 6 base; 7 inner ring subdivision; 8 inner ring magnet shoe; 9 inner ring steel limiter; 10 first kind of bolt hole; 11 second kind of bolt hole; 12 third kind of bolt hole; 13 fourth kind of bolt hole; 14 fifth kind of bolt hole; 15 outer ring steel limiter; 16 outer ring magnet shoe; 17 outer ring subdivision I; 18 outer ring subdivision II; 19 sixth kind of bolt hole; 20 seventh kind of bolt hole; 21 base subdivision.

DETAILED DESCRIPTION

Combining the attached drawings and technical solutions, the detailed implementation method of the invention is further explained in the following parts. Taking one suspender cable of a suspension bridge as an example, the design method of the dimensional parameters and the installation process of the invented absorber are introduced in detail, and the numerical results are combined to illustrate the vibration mitigation effect of the invention for the suspender cable.

A suspension bridge suspender cable is selected, which has an effective calculated length of 60.954 m and a mass of 2961 Kg, and the first order natural frequency of the suspender cable is 1.952 Hz based on the finite element modeling and analysis. According to the steps proposed by the invention, the dimensions of the double-ring shaped strong magnet array nonlinear dynamic vibration absorber are designed: the sum of the outer magnet ring array and the additional weights is 39.09 kg, the mass ratio to the suspender cable to be controlled is set to 1.32%, the optimal damping value of the vibration absorber is calculated to be 70N/(m/s), the optimal linear stiffness value is 4438 N/m, and the optimal cubic stiffness value is $1.511 \times 10^6$ N/m³. Based on the finite element analysis software MAXWELL in the electromagnetic field, the parametric electromagnetic-field numerical model of the double-ring shaped strong magnet array is established, and parameters of the double-ring shaped strong magnet array nonlinear dynamic vibration absorber are calculated as follows: the number of magnet shoes for both inner and outer magnet ring arrays is 9, the thickness of such magnet shoes is 0.018 m, the height of such magnet shoes is 0.1 m, the radius angle of such magnet shoes is 30 degrees, the inner radius of magnet shoes in the inner magnet ring array is 61.5 mm, and the inner radius of magnet shoes in the outer magnet ring array is 129.5 mm; four additional weights are the same, and each has a height of 0.1 m, thickness of 0.04 m and length of 0.36 m. These parameters change as the mass ratio changes.

In order to examine the vibration mitigation effect of this vibration absorber, the finite element model of the suspender cable to be controlled is established based on the SIMULINK software, the dynamic responses of the suspender cable before and after the installation of the double-ring shaped strong magnet array nonlinear dynamic vibration absorber are obtained using the transient analysis method, and the results of displacement and velocity dynamic responses before and after the installation of the damper at the midpoint of the suspender cable are shown in FIG. 6 and FIG. 7, respectively. It can be seen that under the same excitation, the displacement and velocity responses of the midpoint of the suspender cable decrease significantly after the installation of the vibration absorber.

Table 1 shows the comparison results of dynamic responses at the midpoint of the suspender cable with and without a double-ring shaped strong magnet array nonlinear dynamic vibration absorber under the same band-limited white noise excitation, these results are the average values of the dynamic response calculated results under 20 sets of random white noise excitation, and it can be seen that: after the installation of the invented vibration absorber, the displacement and velocity vibration responses at the midpoint of the suspender cable are significantly reduced, and the vibration mitigation effect becomes better with the increase of the mass ratio; the double-ring shaped strong magnet array nonlinear dynamic vibration absorber has significant effect on suppressing the vibration of the suspender cable.

TABLE 1

Reduction values of the vibration responses indices of the midpoint at a suspender cable after the installation of the invented nonlinear dynamic vibration absorber

| | Reduction ratio of displacement vibration response index | | | Reduction ratio of velocity vibration response index | | |
| --- | --- | --- | --- | --- | --- | --- |
| | Variance | Root mean square | Peak | Variance | Root mean square | Peak |
| 1.32% mass ratio | 52.75% | 30.83% | 20.59% | 40.70% | 22.45% | 16.62% |
| 2.00% mass ratio | 67.69% | 41.67% | 33.82% | 54.17% | 31.78% | 24.83% |

The invention claimed is:

1. A double-ring shaped strong magnet array nonlinear dynamic vibration absorber for vibration mitigation of suspender cable, comprising:

an inner magnet ring array configured to be fixed at an installation position of the suspender cable, the inner magnet ring array including two inner ring subdivisions, each inner ring subdivision having a predetermined number of inner ring magnet slots, an inner ring magnet shoe being put in each of the inner ring magnet slots, inner ring steel limiters being fixed to the corresponding inner ring subdivision by bolts, non-slip gaskets being added to an inside of two inner ring subdivisions, an outer magnet ring array including two outer ring subdivisions, each outer ring subdivision having a predetermined number of outer ring magnet slots, and an outer ring magnet shoe being put in each of the outer ring magnet slots, outer ring steel limiters being fixed to the corresponding outer ring subdivisions by bolts, an additional weight installed on a periphery of the outer magnet ring array and fixed together with the outer magnet ring array, the additional weight being a square-shaped body formed by four cuboid mass blocks attached together by bolts, universal wheels attached to the outer ring subdivisions; and a base including two identical base subdivisions, non-slip gaskets being provided on an inside of the base, the two identical base subdivisions being fixed on the suspender cable by bolts to support the outer magnet ring array, the additional weight and the universal wheels, wherein the universal wheels are in direct contact with the base, the universal wheels move in any lateral direction in the plane of the base, the friction of the universal wheels with the base causes damping of the vibration absorber, wherein energy from a vibration of the suspender cable is dissipated through the damping provided by the friction, and wherein magnetic force between the inner magnet ring array and the outer magnet ring array prevents the outer magnet ring array from colliding with the inner magnet ring array during movement.

2. A design method of a double-ring shaped strong magnet array nonlinear dynamic vibration absorber for vibration mitigation of suspender cables, comprising steps of:

step 1, obtaining characteristics of a suspender cable to be controlled by field survey, the characteristics including outer diameter of sheath for the suspender cable, and natural frequencies;

step 2, determining design parameters of the double-ring shaped strong magnet array nonlinear dynamic vibration absorber, the design parameters including:

1) a mass ratio of an outer magnet ring array and additional weights to modal mass of the suspender cable: 1% to 5%, and within which the larger the mass ratio, the better the vibration mitigation effect, and the mass ratio determined according to demand of vibration mitigation for the suspender cable;

2) a damping ratio of the vibration absorber is equal to an optimal damping ratio of a tuned mass damper (TMD) under the same mass ratio;

3) designed values for linear and cubic stiffness of the vibration absorber: numerical model of cable-absorber system is established as shown in equation (1):

$$\begin{cases} M\ddot{w}(t) + C\dot{w}(t) + Kw(t) = F(t) \\ m\ddot{v} + c[\dot{v} - \dot{w}\delta(x-d)] + k_1[v - w\delta(x-d)] + k_2[v - w\delta(x-d)]^3 = 0 \end{cases} \quad (1)$$

where, w(t) denotes vector of displacements corresponding to each degree of freedom of the suspender cable, $\dot{w}(t)$ and $\ddot{w}(t)$ denote velocity and acceleration of the suspender cable, respectively; M denotes mass matrix of the suspender cable; C denotes damping matrix of the suspender cable employing Rayleigh damping; K denotes stiffness matrix of the suspender cable; F(t) denotes sum of external loads on the suspender cable and reaction of the vibration absorber to the suspender cable; m, c, $k_1$, $k_2$ denote mass, damping, linear stiffness and nonlinear stiffness of the vibration absorber, respectively; v denotes displacement of the vibration absorber, $\dot{v}$ and $\ddot{v}$ denote velocity and acceleration of the vibration absorber, respectively; one end of the suspender cable is starting point of x-axis, x is x-axis coordinate of point on the suspender cable, d denotes installation location of the vibration absorber along x-axis, and δ(x−d) is Dirac function;

an objective function for parameter optimization as shown in equation (2)

$$J = \min\left(\frac{\Delta_{control}}{\Delta}\right) \quad (2)$$

where Δ denotes a root-mean-square value, variance of time-history responses of displacement or velocity at a specific location along the suspender cable under an influence of white noise load, $\Delta_{control}$ denotes the root-mean-square value, variance of time-history responses of displacement or velocity at the specific location along the suspender cable under the influence of white noise load when the vibration absorber is deployed, and Δ and $\Delta_{control}$ are selected or established according to the demand of vibration mitigation;

dynamic responses of the suspender cable are calculated by using the numerical model of the cable-absorber system under the white noise loads at multiple points, and the optimal linear stiffness and the optimal nonlinear stiffness are obtained by automatic optimization;

4) geometric parameters of the inner magnet ring and the outer magnet ring array: with overall consideration of cost of the vibration absorber and section size of the suspender cable to be controlled, number, radius angle and inner diameter of magnet shoes in the inner magnet ring array and the outer magnet ring array are determined; a parametric electromagnetic field numerical model of the double-ring shaped strong magnet array nonlinear dynamic vibration absorber system is established, and by adjusting thickness and height of the magnet shoes of the inner magnet ring array and the outer magnet ring array, combination of the inner magnet ring array and the outer magnet ring array achieves designed linear stiffness and designed cubic stiffness;

5) geometric parameters of additional weights for the vibration absorber: total mass of the vibration absorber minus mass of the outer magnet ring array is the mass of additional weights, and then length, width and height of the additional weights are designed according to density of the additional weight;

step 3, machining and fabricating the double-ring shaped strong magnet array nonlinear dynamic vibration absorber according to the design parameters obtained from step 2; and step 4, installing the manufactured double-ring shaped strong magnet array nonlinear dynamic vibration absorber on the suspender cable in the laboratory, and measuring the force-displacement relationship of the double-ring shaped strong magnet array nonlinear dynamic vibration absorber with a dynamometer and a ruler to ensure the linear and cubic stiffness of the vibration absorber to be the design values; letting the vibration absorber move freely, then measuring the displacement signal of the outer magnet ring array, and determining the damping ratio by free-vibration decay method etc., and then adjusting the damping ratio by adjusting the friction force between universal wheels and a base.

\* \* \* \* \*